United States Patent [19]

Harris

[11] 3,970,106
[45] July 20, 1976

[54] COLLAPSIBLE BALL VALVE

[75] Inventor: Jesse Harris, San Antonio, Tex.

[73] Assignee: Reed Tool Company, Houston, Tex.

[22] Filed: Mar. 3, 1975

[21] Appl. No.: 554,640

[52] U.S. Cl. .......................... 137/843; 137/533.11; 166/225
[51] Int. Cl.² ....................................... F16K 15/14
[58] Field of Search .......... 137/525, 533.11, 533.13, 137/533.15, 539; 166/224 A, 225

[56] References Cited
UNITED STATES PATENTS

| | | | |
|---|---|---|---|
| 2,536,836 | 1/1951 | Bowling | 137/533.11 X |
| 3,096,825 | 7/1963 | Clark, Jr. | 137/269.5 X |
| 3,367,362 | 2/1968 | Hoffman | 137/517 |
| 3,547,355 | 12/1970 | Salazar | 137/525 X |

FOREIGN PATENTS OR APPLICATIONS

| | | | |
|---|---|---|---|
| 1,275,628 | 12/1960 | France | 137/533.15 |

Primary Examiner—William R. Cline
Attorney, Agent, or Firm—Cox, Smith, Smith, Hale & Guenther Incorporated

[57] ABSTRACT

A collapsible ball check valve for use in high pressure pneumatic devices to prevent a backflow upon loss of the high pressure while, simultaneously, not requiring a pressure loss to operate the check valve. The pressure of the fluid causes the hollow ball to collapse inwardly, thereby allowing fluid to continue to flow through the flow passage around the collapsed ball valve and through the valve seat which is provided with a plurality of inwardly sloped passages to allow fluid flow therethrough upon collapse of the hollow ball. Upon losing pressure in the flow passage, the ball valve resumes its normal shape to press against a flanged opening in the flow passage thereby preventing a reverse flow of fluid.

9 Claims, 6 Drawing Figures

COLLAPSIBLE BALL VALVE

BACKGROUND OF THE INVENTION

This invention relates to check valves and, more particularly to collapsible ball check valves designed to prevent reverse flow upon loss of fluid pressure.

The present invention in its preferred embodiment is shown in conjunction with a pneumatic drilling tool, as more fully disclosed and described in U.S. patent application Ser. No. 507,968 filed on Sept. 20, 1974, which is hereby incorporated by reference.

BRIEF DESCRIPTION OF THE PRIOR ART

Prior to the present invention other types of collapsible ball valves have been used in controlling fluid flow; however, all of the balls collapse in response to pressure to stop fluid flow. When the ball was in its normal uncollapsed configuration, fluid would continue to flow through the flow passages. None of the prior devices showed a collapsible ball that would prevent the reverse flow of fluid when the ball was in the uncollapsed configuration. None of the prior art as known by the applicant, shows a collapsible ball that would deform to allow unrestricted high pressure pneumatic fluid to flow through a flow passage, but upon loss of the high pressure pneumatic fluid, would resume its normal configuration, thereby preventing a low pressure reverse flow through the flow passage.

Some of the prior art devices showed a ball valve that moved from one position to another position, depending upon the direction of flow with a reverse flow being required before the ball valve would change its position. This inevitably meant that there would be some reverse flow through the check valve prior to the ball valve moving from one position to the other position. In many operations such a reverse flow could be very detrimental to the overall system.

More particularly, in pneumatic drilling devices, ball check valves have been used to stop reverse flow upon the ball changing positions, as is specifically shown in U.S. Pat. No. 3,096,825, but again a reverse flow would be required to move the ball from one position to the other position. This would result in a reverse flow of fluid.

SUMMARY OF THE INVENTION

It is an object of the present invention to provide a collapsible ball check valve.

It is still another object of the present invention to provide a ball check valve wherein the ball collapses under high pressure thereby allowing unrestricted flow through the valve; however, upon loss of the high pressure the ball resumes its normal shape, thereby stopping a reverse flow of low pressure fluid through the valve.

It is a further object of the present invention to provide a collapsible ball check valve wherein the ball under no pressure or low pressure would have a normal spherical configuration that mates against a flanged upper opening and a lower valve seat to prevent fluid flow in either direction through the valve, but upon being subject to a high pressure on the upper side of the valve, the ball will collapse thereby allowing unrestricted flow through the flanged opening around the collapsed ball and through the valve seat.

It is yet another object of the present invention to provide a collapsible ball check valve for use in pneumatic drilling devices wherein a high pressue pneumatic fluid is applied to the drilling device from the surface with the high pressure fluid causing the collapsible ball to deform, thereby allowing unrestricted flow to the drilling apparatus, but upon loss of the high pressure fluid the ball will resume its normal configuration thereby resting against the valve seat and the flanged opening to stop a back surge of the pneumatic fluid. This prevents cuttings from being drawn up into a pneumatic drilling device.

It is a further object of the present invention to have a collapsible ball check valve made integral with a pneumatic drilling device wherein the ball will prevent low pressure fluid flow but upon being subject to high pressure fluid from the surface will collapse thereby allowing unrestricted flow through the valve and valve seat, but upon loss of the high pressure pneumatic fluid from the surface, will resume its normal configuration thereby preventing reverse fluid flow.

BRIEF DESCRIPTION OF THE PREFERRED EMBODIMENT

Figure 1:
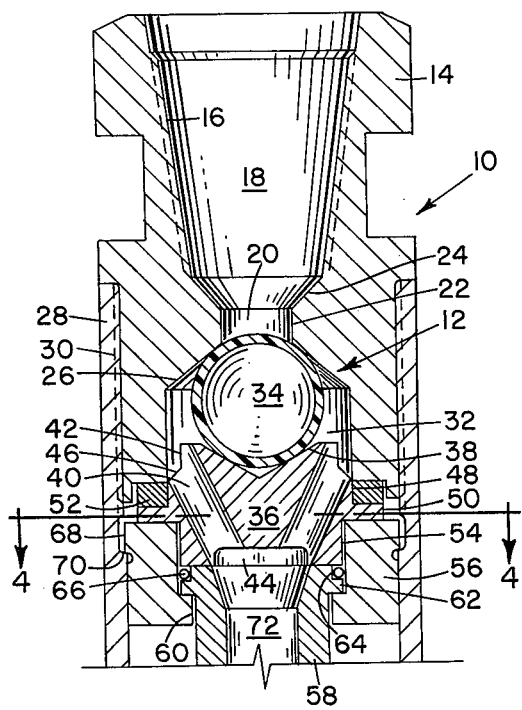
FIG. 1 is an elevated cross sectional view of the collapsible ball check valve being used in conjunction with a pneumatic drilling tool.
Figure 2:
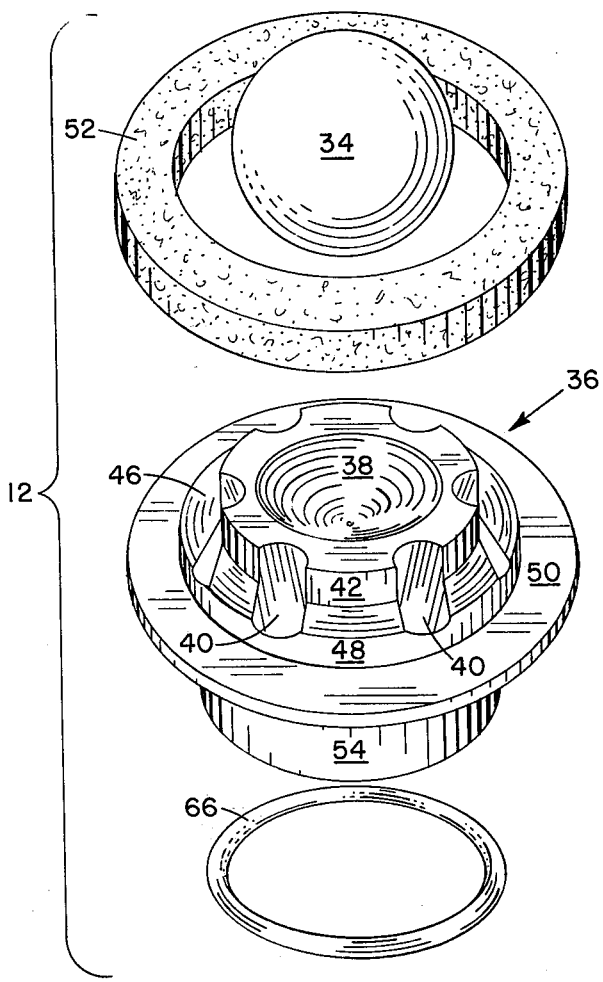
FIG. 2 is an exploded pictorial view of the collapsible ball and valve seat as shown in conjunction with FIG. 1.
Figure 3:
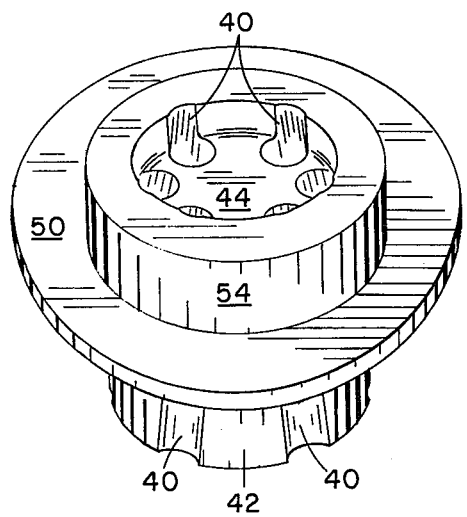
FIG. 3 is a pictorial view of the opposite side of the valve seat as shown in FIG. 2.
Figure 4:
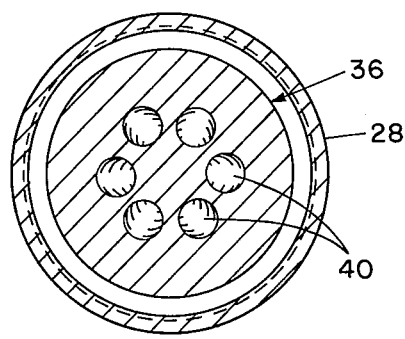
FIG. 4 is a sectional view of FIG. 1 along section lines 4—4.

Referring now to FIG. 1 of the drawings, there is shown a partial sectional view of an upper portion of a pneumatic impact drilling tool represented generally by the reference numeral 10, and including the collapsible ball check valve 12. The pneumatic impact drilling tool 10 has an upper sub 14 that may be connected to a string of drilling pipe (not shown) by means of threads 16. Pneumatic fluid from the drilling pipe will flow through opening 18 and large orifice 20 formed by inward flange 22. The inward flange 22 has a tapered upper surface 24 and a tapered lower surface 26.

The lower portion of the upper sub 14 is connected to a casing 28 by means of threads 30. Inside of the bottom of upper sub 14 is a generally cylindrical space 32 that contains the collapsible ball check valve 12. In the cylindrical space 32 is located a hollow ball 34 that rests against the tapered lower surface 26 of the inward flange 22 which forms large orifice 20. Immediately below the hollow ball 34 is located a valve seat 36 having a recess 38 located in the top thereof in which the hollow ball 34 is positioned.

Referring now to FIGS. 1, 2, 3 and 4 in combination, a better understanding of the collapsible ball valve 12 and the valve seat 36 can be obtained. Immediately around the recess 38 is located a plurality of inwardly slanting holes 40 as can best be seen in FIGS. 1 and 2. The plurality of inwardly slanting holes 40 start from the upper outer surface 42 that surrounds recess 38 and extend downward and inward to the bottom center recess 44. The upper outer surface 42 has an outward sloped portion 46 to circumscribe the outermost portion of all of the inwardly slanting holes 40. The outwardly sloped portion 46 terminates into cylindrical surface 48 which further extends downward to circumferential mounting flange 50. Immediately adjacent the cylindrical surface 48 and above the circumferential mounting flange 50 is located a seal 52 formed from a resilient substance such as rubber. The seal 52 is compressed between circumferential mounting flange 50 and the bottom of upper sub 14 in a manner as will be subsequently described. Immediately below the circumferential mounting flange 50 is located lower cylindrical surface 54 that terminates with the bottom of the valve seat 36, with the bottom center recess 44 being contained therein.

Immediately below the circumferential mounting flange 50 of the valve seat 36 is located feeder retainer 56. Feeder retainer 56 holds feeder 58 into position by means of inward flange 60 mating against upper feeder flange 62. The upper outer edge of feeder 58 has a recess for receiving an O-ring type of seal 66. Also, feeder retainer 56 has a small shoulder 68 for resting against lip 70 of casing 28.

The upper portion of the pneumatic impact drilling tool 10 is assembled by dropping the feeder retainer 36 inside of the casing until small shoulder 68 rests against lip 70 of the casing 28. Next the feeder 58 is dropped into position inside of feeder retainer 56 until the upper feeder flange 62 comes to rest against inward flange 60 of the feeder retainer 58. The O-ring seal 66 is then placed inside of recess 64 and the valve seat 36 is placed in the position shown in FIG. 1. Next the seal 52 is placed above the circumferential mounting flange 50 of the valve seat 36 and the hollow ball 34 is placed in recess 38 of the valve seat 36. Now the upper sub 14 is threadably connected to casing 28 by means of threads 30 until the entire assembly is held tightly in position, thereby sealing any leaks around seal 52 and O-ring 66 so that the entire high pressure fluid would flow through opening 18, large orifice 20, cylindrical space 32, inwardly slanting holes 40, bottom center recess 44 and the center opening 72 of feeder 58.

METHOD OF OPERATION

Figure 5:
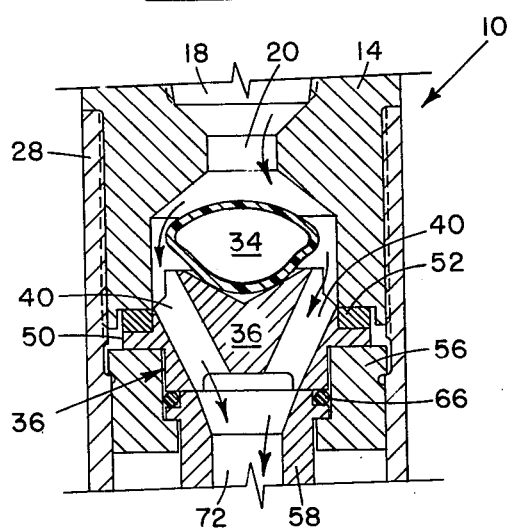
FIG. 5 is a cross sectional pictorial illustration of the collapsible ball valve being subject to high pressure fluid which collapses the ball to allow fluid flow.

Referring now to FIG. 5 of the drawing, there is shown a pictorial illustration of the preferred embodiment just described in conjunction with FIGS. 1–4. As high pressure fluid enters upper sub 14 through opening 18 pressure is exerted on the hollow ball 34 through large orifice 20. The pressure, which is of a high value, causes the hollow ball 34 to collapse as pictorially shown in FIG. 5, thereby allowing fluid to flow around the hollow ball 34 as indicated by the arrows. Because the hollow ball 34 has collapsed it does not exert a back pressure to restrict the flow of the pneumatic fluid which continues to flow downward through inwardly slanting holes 40 of the valve seat 36 and through center opening 72 of feeder 58.

Figure 6:
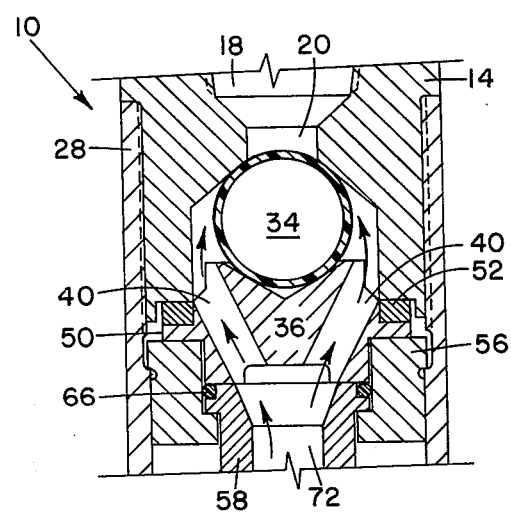
FIG. 6 is a pictorial illustration of the collapsible ball valve being subject to a low reverse pressure.

Assuming now that the high pressure pneumatic fluid, as previously described in conjunction with FIG. 5, is suddenly lost, a much smaller back pressure tending to cause a back flow through the collapsible ball check valve 12 will exist. Immediately upon loss of the high pressure pneumatic fluid, the collapsible ball 34 will resume its normal configuration as shown in FIG. 6, thereby restricting flow through large orifice 20 due to the pressing of ball 34 against tapered lower surface 26. The back pressure which is represented by the arrows is FIG. 6 is of a very low value when compared to the normal pressure exerted through large orifice 20. No flow will occur in either direction through collapsible ball check valve 12 when a low pressure is exerted. Even when a large back pressure is exerted on ball 34, the ball 34 will deform against the tapered lower surface 26 and still maintain a good seal to prevent back flow through large orifice 20.

The hollow ball 34 may be of any conventional type; however, in the preferred embodiment the applicant has used a particular type of hollow ball that does not have seams as is the case of hollow balls that are stamped in halves and molded together. The hollow ball 34 is formed from a liquid polyurethane rubber poured into one half of a mold with the other mold being connected thereto. Afterwards the mold is spun on two axis thereby slinging the polyurethane rubber to the outer extremities of the mold. This spinning process is continued until the liquid polyurethane rubber hardens. The thickness of the hollow ball should be sufficient to insure the rigidity is enough to maintain a good seal between the tapered lower surface 26 of inward flange 22 until a predetermined pressure level has been reached by the pneumatic fluid in large orifice 20. Also the rigidity of the hollow ball 34 and the size of the large orifice 20 should be sufficiently matched to withstand maximum back pressures that may occur in normal drilling operations upon loss of surface pressure.

While the present invention has been described in conjunction with a pneumatic drilling apparatus, more particularly, a pneumatic drilling tool, it should be understood that it can be used as a flow control device for any type of high pressure fluid wherein a backflow is highly undesirable upon loss of high pressure. It should also be understood that the present collapsible ball check valve does not reduce the pressure of the high pressure fluid flowing therethrough by any significant amount. In a hydraulic system, the collapsible ball would act as a shock suppressor due to the deformations of the ball as the line pressure varies. The collapsible ball has the same characteristics as an in-line air bag shock suppressor.

I claim:
1. A collapsible ball check valve for use with high pressure fluid, said valve comprising:
   a housing having an inlet passage therein with a space therebetween;
   a hollow ball located in a fixed position in said space for sealing said inlet passage by pressing against walls forming said inlet passage as the walls connect to said space;
   seat means for retaining said hollow ball in said space, flow passages extending through said seat means to said outlet passage, said seat means having a retaining surface abutting said hollow ball in said fixed position;
   said hollow ball sealing said inlet passage against fluid flow by being pressed between said wall forming said inlet passage and said retaining surface of said seat means in said fixed position, said hollow ball being resilient to collapse under a given pressure in said inlet passage to allow unrestricted fluid flow through said inlet passage, flow passages and outlet passage, upon loss of said given pressure in said inlet passage said hollow ball resumes a spherical configuration to prevent reverse flow through said inlet passage, flow passages and outlet.

2. The collapsible ball check valve as recited in claim 1 wherein said inlet passage has a large orifice formed by an inward flange in said wall, said hollow ball pressing against said inward flange when said hollow ball is in said spherical configuration.

3. The collapsible ball check valve as recited in claim 2 wherein said flow passages of valve seat means are inwardly sloped holes extending from the top outside portion surrounding said retaining surface of said seat means to the lower portion of said seat means, said inwardly sloped holes converging on a recess in the bottom of said seat means, said recess in fluid communication with said outlet passage.

4. The collapsible ball check valve as recited in claim 3 wherein said seat means includes a flange for retaining seat means in said space of said housing, seal means preventing leaks of said fluid from around said seat means.

5. A collapsible ball check valve for use in a pneumatic drilling apparatus, said collapsible ball check valve comprising:
   flow passage in said drilling apparatus, said flow passage having an inwardly extending shoulder; a collapsible hollow ball located in a fixed position to press against said shoulder when in an approximately spherical configuration;
   seat means for retaining said ball in said fixed position in said flow passage, said seat means being supported by a housing that forms said flow passage, said seat means having openings therethrough to allow flow through said flow passage and said openings, said openings being spaced about a position occupied by said ball on said seat means;
   said hollow ball being resilient to collapse inwardly against said seat means upon receiving a high pressure pneumatic fluid from said drilling apparatus thereby allowing pneumatic fluid to flow in one direction through said flow passage and said opening, upon loss of said high pressure pneumatic fluid said ball will remsume an approximately spherical configuration thereby preventing fluid flow by sealing against said shoulder.

6. The collapsible ball check valve as recited in claim 5 wherein said flow passage is formed as part of a pneumatic drilling tool.

7. The collapsible ball check valve as recited in claim 6 wherein said seat means includes a recess in which said ball is located, said openings extending downwardly and inwardly through seat means to allow normal downward flow through said pneumatic drilling tool.

8. The collapsible ball check valve as recited in claim 7 wherein said seat means includes sealing means to prevent flow except through said openings.

9. The collapsible ball check valve as recited in claim 7 wherein said flow passage includes an upper sub, a casing connected to said upper sub with said ball and seat means being carried by said connection.

* * * * *